United States Patent [19]
Maeda et al.

[11] Patent Number: 5,638,270
[45] Date of Patent: Jun. 10, 1997

[54] ENGINE CONTROL SYSTEM WITH VEHICLE ANTI-THEFT FUNCTION

[75] Inventors: Susumu Maeda; Eiji Mutoh; Shinichi Kubota; Takashi Kawachi, all of Wako, Japan

[73] Assignee: Honda Giken Kogyo Kabushiki Kaisha, Tokyo, Japan

[21] Appl. No.: 464,366

[22] Filed: Jun. 5, 1995

[30] Foreign Application Priority Data

Feb. 17, 1995 [JP] Japan .................... 7-052107

[51] Int. Cl.⁶ .................................. B60R 25/04
[52] U.S. Cl. .................. 364/423.098; 364/424.045; 180/287; 307/10.3; 340/428
[58] Field of Search ............ 364/423.098, 424.045; 307/10.2, 10.3, 10.5; 340/426, 428, 568; 180/287

[56] References Cited

U.S. PATENT DOCUMENTS

| | | | |
|---|---|---|---|
| 4,291,237 | 9/1981 | Kitano | 180/287 |
| 4,366,466 | 12/1982 | Lutz | 180/287 |
| 4,749,873 | 6/1988 | Mutoh et al. | 307/10.2 |
| 4,754,255 | 6/1988 | Sanders et al. | 180/287 |
| 4,965,460 | 10/1990 | Tanaka et al. | 180/287 |
| 5,111,185 | 5/1992 | Kozaki | 340/568 |
| 5,287,006 | 2/1994 | Carlo et al. | 180/287 |
| 5,449,957 | 9/1995 | Carlo | 307/10.3 |
| 5,519,376 | 5/1996 | Iijima | 180/287 |

FOREIGN PATENT DOCUMENTS

| | | |
|---|---|---|
| 0 372 741 | 6/1990 | European Pat. Off. . |
| 2046827 | 11/1980 | United Kingdom . |

*Primary Examiner*—Gary Chin
*Attorney, Agent, or Firm*—Pollock, Vande Sande & Priddy

[57] ABSTRACT

An engine control system in which control of an engine can be performed after there has been a momentary power disconnection of a power supply, such as the vechicle battery, from an engine control unit of an electronic circuit which executes an anti-theft function. A power supply detecting circuit detect a connecting of the power supply to the engine control unit. A further circuit determines on the basis of the vehicle speed and the RPM whether or not the vehicle is running. When a connecting of the power supply to the engine control unit is dectected, a determination is made whether or not the power supply connecting has occured after a preceding momentary power disconnection if the further circuit determines that the vehicle is running. The anit-theft function of the electronic circuit is disable when it is determined that there has been a preceding momentary power desconnection.

5 Claims, 3 Drawing Sheets

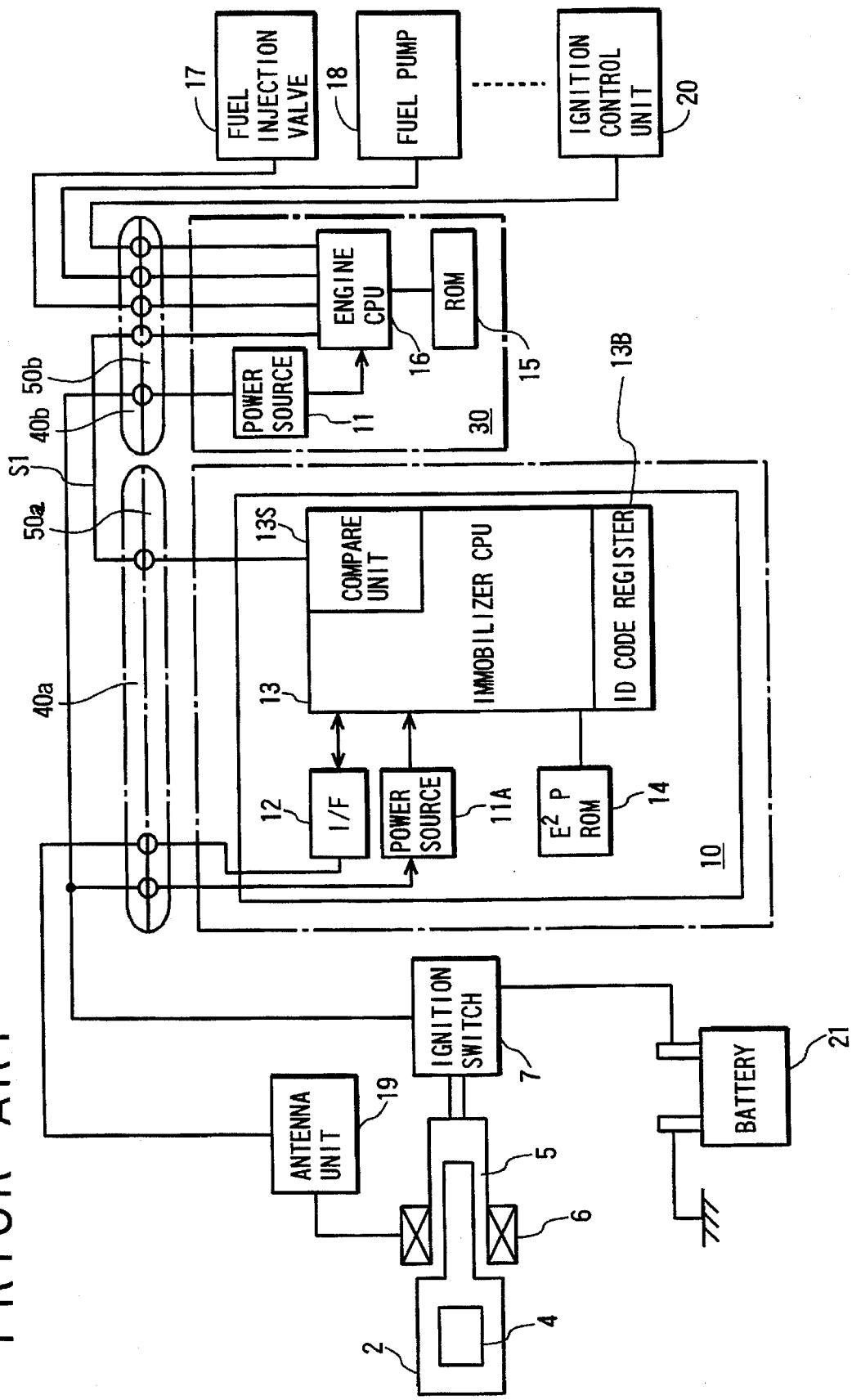

ENGINE CONTROL SYSTEM WITH VEHICLE ANTI-THEFT FUNCTION

BACKGROUND OF THE INVENTION

1. Field of the Invention

The present invention relates to an engine control system with a vehicle anti-theft function, and particularly to an engine control system with a vehicle anti-theft function in which the start-up of the engine is enabled on the condition that a predetermined relationship is satisfied by an ID code previously registered in the ignition key or the like and another ID code previously registered on the vehicle body.

2. Description of the Prior Art

In some of the various proposals for preventing the theft of a vehicle such as a car, the vehicle is prevented from being started or it is immobilized by mechanical and/or electrical means when it is attempted to be started or moved using a wrong ignition key. This is achieved by previously storing an identification code or a key ID code in an ignition key, reading the key ID code when the key is inserted into a key cylinder to start up the engine, comparing it with a reference ID code prestored in the vehicle, and generating an enable signal and enabling the engine to be started up only when there is a match between both ID codes. In this case, since a theft may be committed by mechanical breakage or illegal re-wiring if the enable signal is a binary signal of on/off, the encoding of the enable signal has been proposed, for instance, in the "Car Technology", Vol. 48, No. 8, 1994, pp. 59–64.

An example of such a conventional transponder type immobilizer is shown in FIG. 6. An ignition key 2 includes a memory (not shown) in which a key ID code (for instance, of 64 bits) is prestored, and a transmitter 4 for transmitting the key ID code. The transmitter 4 of the key 2 and a key cylinder 5 are coupled together by, for instance, an induction coil (antenna) 6.

When the ignition key 2 is inserted into the key cylinder and rotated to the ignition ON position, an ignition switch 7 is closed. In response to this, an immobilizer CPU 13 in an IMMOBI-HIC 10 (hybrid IC for controlling the immobilizer) operates, and an operating electric power is supplied from the IMMOBI-HIC 10 to the transmitter 4 through an I/F (interface) 12, an antenna unit 19 and the coil (antenna) 6. The antenna unit 19 is electrically connected to the IMMOBI-HIC 10 along with the ignition switch 7 (and a battery 21) through a pair of connectors 40a and 50a. The transmitter 4 responds to the power supply to read the key ID code, and transmits it to the key cylinder 5 side.

The received key ID code is amplified in the antenna unit 19, read into the immobilizer CPU 13 and temporarily stored in an appropriate ID code register 13B in the CPU 13. In an EEPROM 14 of the IMMOBI-HIC 10, a unique reference ID code assigned to each vehicle is prestored, and the reference ID code and the key ID code which was read in are compared with each other by a compare unit 13S of the CPU 13. If it is determined that there is a match between the two ID codes or they are in a predetermined relationship, an enable code or a code signal is transmitted from the compare unit 13S to an engine control unit (engine CPU) 16. At the same time, a starter relay is activated to initiate the rotation of a starter motor (not shown).

The ECU 30 comprises a power supply 11, an engine CPU 16 and a ROM 15. The IMMOBI-HIC 10, fuel injection valve 17, fuel pump 18, ignition control unit 20 and battery 21 and others are electrically connected with each other through a pair of connectors 40a, 50a, and 40b, 50b.

In a ROM 15 of the engine ECU 30, an engine control program is stored which includes at least an engine control algorithm, an I/O (Input/Output) control algorithm and an anti-theft algorithm. The engine CPU 16 operates according to the engine control program, and discriminates or verifies the reception of the enable code on the basis of the anti-theft algorithm. If the enable code is correct code data, the engine CPU 16 performs a predetermined control based on the engine control algorithm for the respective terminal devices such as the fuel injection valve 17, the fuel pump 18 and the ignition control unit 20 connected to the signal port selected by the I/O control algorithm, thereby to enable the start and running of the vehicle.

If the reference ID code stored in the EEPROM 14 and the key ID code transmitted from the ignition key 2 and read in do not match each other or they are not in a predetermined relationship, the compare function unit 13S does not issue an enable code. Accordingly, the start of the vehicle by the CPU 16 is inhibited, and a horn (not shown) is activated by the immobilizer CPU 13 to provide an appropriate alarm and display.

When the enable code or code signal S1 transmitted from the compare unit 13S is not correct code data, the start of the vehicle by the engine CPU 16 is also inhibited. Thus, the Illegal start-up of the engine and the driving of the vehicle by a wrong key are prevented to ensure the vehicle anti-theft function.

In the foregoing prior art, electrical connection between the ECU 30 and the battery 21 is held by a mechanical contact between connector members of the connectors 40b and 50b. Accordingly, in case, for example, a vehicle wheel runs onto a side edge of the road, when large shock or vibration is exerted onto the vehicle, it is possible that the electrical connection in the connectors is disconnected momentarily to cause the engine to be stalled.

At this time, when the momentary disconnection of the electrical power occurs only relative to the ECU 30, and not relative to the other units, such as the IMMOBI-HIC 10, the ECU 30 is reset and starts over again the processes for the foregoing anti-theft determination. However, since the power disconnection has not occurred in the IMMOBI-HIC 10, a sequence of the processes for the anti-theft determination, for example, outputting of the code signal S1 for the correctness determination is not performed.

Accordingly, even if a driver turns the ignition switch from an ON position to a START position to restart the engine, the ECU 30 cannot receive the code signal S1 to be sent from the IMMOBI-HIC 10. As a result, the ECU 30 determines that an illegitimate or wrong engine key is being used, and thus prohibits the engine control. For enabling the engine control, the driver is required to first return the ignition switch to an OFF position to cause the IMMOBI-HIC 10 and the like to recognize the power disconnection, and thereafter, to perform again the engine start-up operation so as to allow a sequence of the anti-theft determination processes to be executed from the beginning.

SUMMARY OF THE INVENTION

It is an object of the present invention to provide an engine control system with a vehicle anti-theft function which can easily perform the engine restart-up even when there has been a momentary disconnection of a power supply from an electric circuit which executes an anti-theft determination.

The present invention is characterized in that in an engine control system with a vehicle anti-theft function which determines, at the time a power supply, is connected to an anti-theft determination circuit, whether or not an ID code inputted to a vehicle is a correct ID code and allows an engine control when it is correct ID code, it is arranged to determine, whenever a power supply connection is made, whether or not the connection is being made after a momentary disconnection of the power supply, and to disable the vehicle anti-theft function in case the power supply connection occures after a momentary disconnection.

According to the foregoing structure, when a large shock or vibration exerted on the vehicle disconnects the power supply from an ECU having an IMMOBI function so that the engine is stalled, it is determined, at the time the power supply is reconnected, whether or not connection of the power supply after the follows a momentary disconnection thereof. When the determination is affirmative the IMMOBI function of the ECU is disabled or annulled. Accordingly, even when the IMMOBI function ECU cannot receive data necessary for a theft determination due to absence of the momentary power disconnection from the other units having the IMMOBI function, the ECU does not execute the theft determination and the engine can be restarted by merely turning the ignition switch from an ON position to a START position.

BRIEF DESCRIPTION OF THE DRAWINGS

FIG. 6 is a block diagram of the prior art transponder immobilizer.

DETAILED DESCRIPTION OF THE PREFERRED EMBODIMENTS

Figure 1:
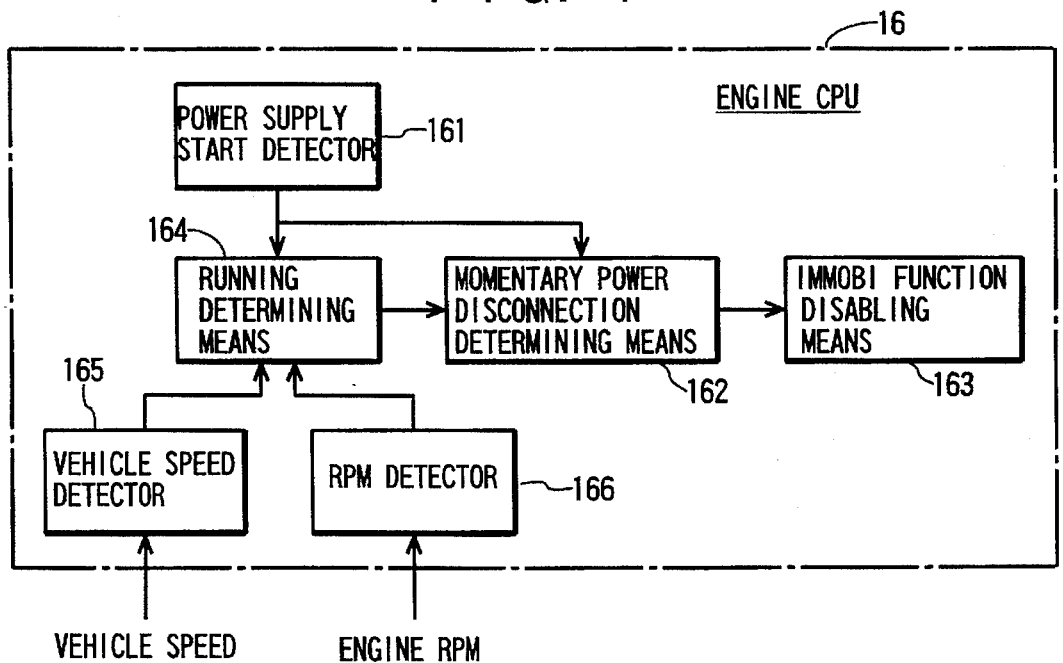
FIG. 1 is a functional block diagram of a first embodiment of the present invention.

Hereinbelow, embodiments of the present invention will be described in detail with reference to the accompanying drawings. FIG. 1 is a block diagram showing functions of an engine CPU 16 to be installed in the ECU 30 having the IMMOBI function, according to the first embodiment of the present invention. The same references as those described before represent the same or corresponding parts.

The engine CPU 16 is composed of power supply start detecting means 161 for detecting the connection of a power supply battery 21, vehicle speed detecting means 165 for detecting a running speed of the vehicle, engine RPM detecting means 166 for detecting the number of engine RPM, running determining means 164 for determining, based on the vehicle speed and the engine RPM, whether or not the vehicle is running, momentary power disconnection determining means 162 for determining, responsive to detection of a power supply connection by the power supply start detecting means 161, whether or not the detected power supply connection has occurred after a momentary power disconnection based on the detection result of whether or not the vehicle is running, and IMMOBI function disabling means 163 for disabling the IMMOBI function of the ECU 30, when it is determined that the power supply connection has occurred after a momentary disconnection thereof.

Figure 2:
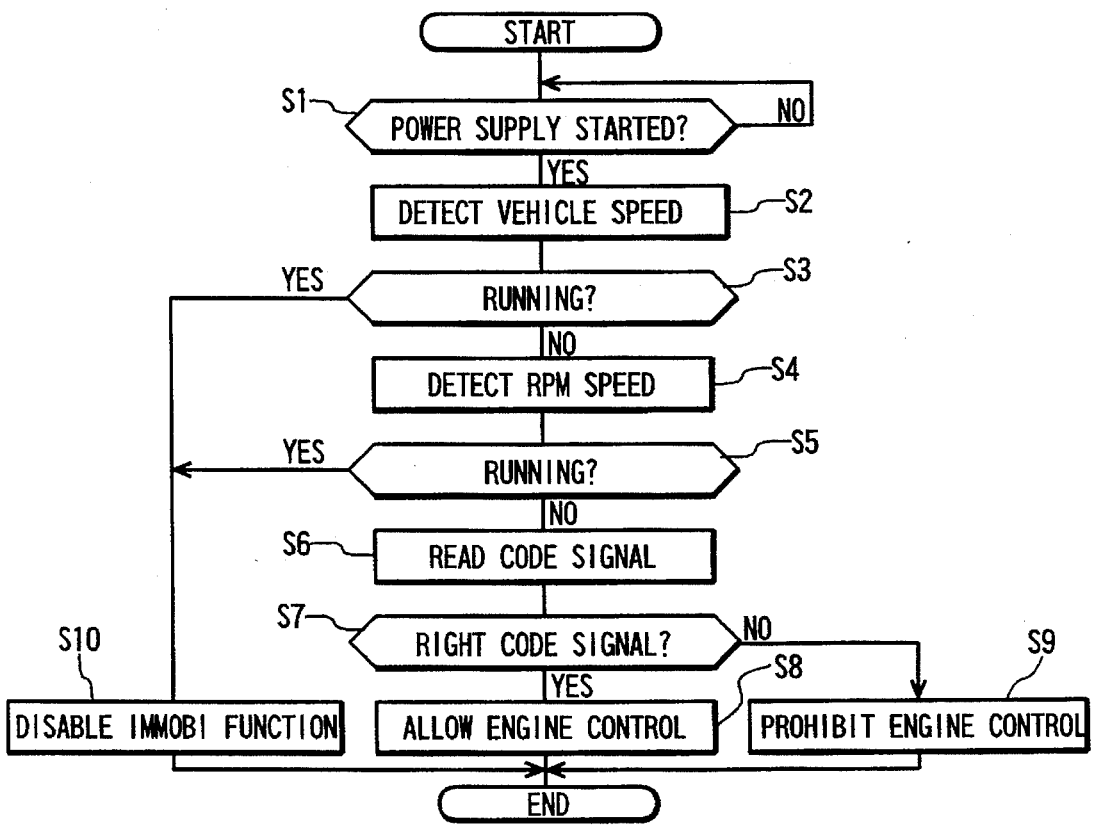
FIG. 2 is a flow chart showing the operation of the first embodiment.

FIG. 2 is a flowchart representing an operation of the present embodiment. When initiation of the power supply, that is, the ON position of the ignition switch is detected by the power supply start detecting means 161 at step S1, a running speed of the vehicle is detected by the vehicle speed detecting means 165 at step S2. At step S3, the running determining means 164 determines based on the detected vehicle speed whether or not the vehicle is running. If it is determined that the vehicle is stopping, the operation advances to step S4.

At step S4, an engine speed or RPM is detected by the engine RPM detecting means 166. At step S5, the running determining means 164 again determines based on the detected engine RPM whether or not the vehicle is running. If it is determined that the vehicle has stopped, the operation advances to step S6. At step S6, the code signal S1 sent from the IMMOBI-HIC 10 is read in. At step S7, it is determined whether or not the code signal S1 is correct or normal. If the determination is affirmative, the engine control is allowed at step S8. If it is determined that the code signal is not the normal code signal, the engine control is prohibited at step S9.

At the foregoing step S3 or S5, if the running determining means 164 determines that the vehicle is running, the momentary power disconnection determining means 162 determines that initiation of the power supply follows a momentary power disconnection. Then, at step S10, the IMMOBI function disabling means 163 disables the IMMOBI function. In other words, the reading of the code signal from the IMMOBI-HIC 10 is stopped so that the engine control is substantially allowed.

According to the present embodiment, every time the power supply is initiated. It is determined whether or not the vehicle is running based on the vehicle speed and/or the engine RPM. If it is determined that the vehicle is running, the current power supply connection is determined to be after a momentary power disconnection so that the IMMOBI function is disabled. Accordingly, even when the engine is stalled due to the momentary power disconnection, the engine can be restarted by merely turning the ignition switch from the ON position to the START position. Thus, although the IMMOBI function is installed, the maneuverability is not impaired.

Figure 3:
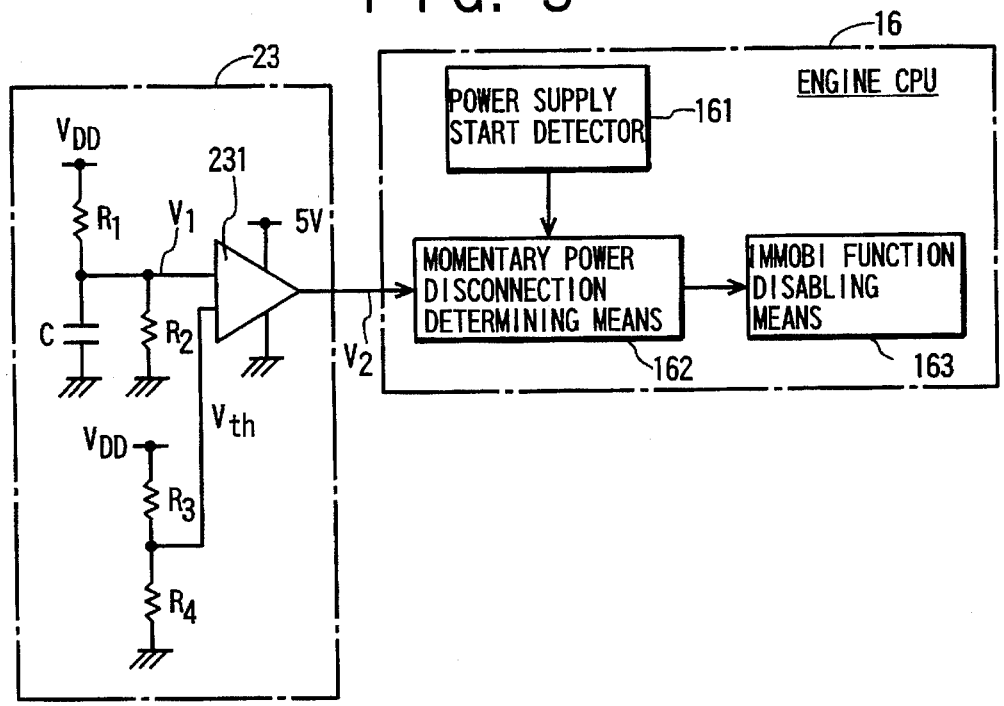
FIG. 3 is a functional block diagram of a second embodiment of the present invention.

FIG. 3 is a block diagram showing the function of the ECU 30 having the IMMOBI function, according to the second embodiment of the present invention. Reference numerals that are the same as those described before represent the same or corresponding parts. In the second embodiment, a time constant circuit 23 is provided which receives charges from the battery, and charges and circuit 23 discharges with given time constants so as to produce a voltage corresponding to a charge amount. When the power supply is started, an output voltage V2 of the time constant circuit 23 is detected. When the output voltage V2 is at a high level, it is decided that connection or initiation of the power supply has occurred after a momentary power disconnection so as to disable the IMMOBI function.

In FIG. 3, the time constant circuit 23 includes a comparator 231 having first and second input terminals. A power source voltage (VDD) divided by resistors R1 and R2, V1 is inputted to the first input terminal of the comparator 231, while another voltage divided by resistors R3 and R4 is inputted to the second input terminal thereof as a threshold voltage Vth of the comparator 231. The first input terminal is grounded via a capacitor C.

Figure 4:
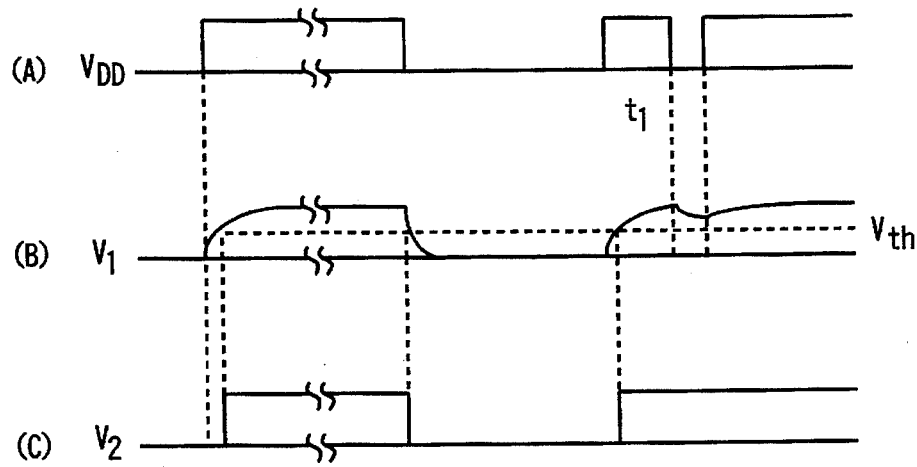
FIG. 4 is a time chart showing the operation of the second embodiment.

FIG. 4(A) shows a power source voltage VDD, (B) a voltage V1 applied to the first input terminal of the comparator 231, and (C) an output voltage V2 of the comparator 231. When the momentary power disconnection occurs at time t1 in the supply voltage VDD, the voltage V1 gradually falls down due to discharge of the capacitor C through the resistor R2. However, since it is the momentary power disconnection, the voltage V1 is restored before going below a threshold value Vth of the comparator so that the output voltage V2 can be held constant at high level.

In the engine CPU 16, when initiation of the power supply is detected by the power supply start detecting means 161, the momentary power disconnection determining means 162 detects the output voltage V2 of the time constant circuit 23 (comparator 231). When the detected output voltage V2 is at "H" level, the momentary power disconnection determining means 162 determines the current power supply initiation has occurred just after a momentary disconnection. Then the IMMOBI function disabling means 163 disables the IMMOBI function and substantially allows the engine control by the engine CPU 16.

According to the present embodiment, every time the power supply is initiated, when the current power supply connection is determined to have occurred after momentary disconnection the IMMOBI function is disabled. Accordingly, even when the engine is stalled due to the momentary power disconnection, the engine can be restarted by merely turning the ignition switch from the ON position to the START position. Thus, although the IMMOBI function is installed, maneuverability of the vehicle is not impaired.

In the foregoing first and second embodiments, the IMMOBI function is not activated so as to disable the IMMOBI function whenever it is determined that the power supply initiation or connection has occurred after the momentary disconnection. On the other hand, as another method for disabling the IMMOBI function, it may be arranged, for example, to allow the engine control unconditionally by supplying the correct code signal or enable code (or pseudo-signal) to the engine CPU 10.

Figure 5:
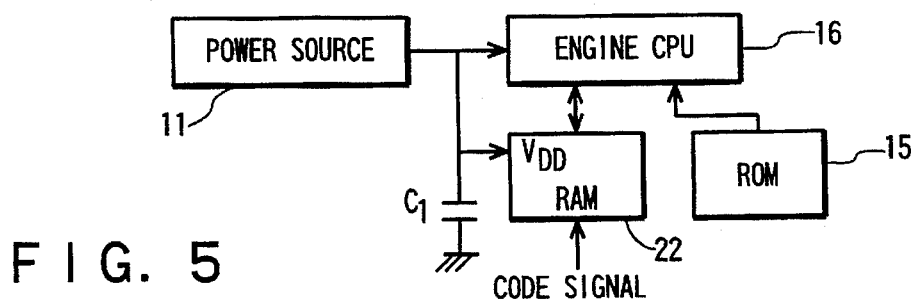
FIG. 5 is a functional block diagram of a third embodiment of the present invention.

FIG. 5 is a block diagram showing functions of the ECU 30 having the IMMOBI function, according to the third embodiment of the present invention. Reference numerals that are the same as those described before represent the same or corresponding parts. In the present embodiment, a backed-up memory (RAM) 22 is provided for storing a comparison result of a key ID code with a reference ID code. Every time the power supply is initiated after the momentary disconnection, it is arranged to determine whether to allow or prohibit the engine control on the basis of the contents stored in the backed-up memory 22.

A power terminal VDD of the RAM 22 is connected to a power source 11 and is connected with one end of a backup capacitor C1 the other end of which is connected to ground. The capacitance of the backup capacitor C1 is set at such a value that the data stored in the RAM 22 is not lost due to the momentary power disconnection for example, so that the data can be held in the RAM 22 for several seconds, but it is lost when the driver turns off the engine.

In the foregoing structure, when an ignition key 2 is inserted into a key cylinder 5 and turned to the ON position of the ignition switch, the key ID code and the reference ID code are compared in the IMMOBI-HIC 10. The result of the comparison is stored in the RAM 22 as a code signal. The engine CPU 16 determines whether to allow or prohibit the engine control by referring to the stored contents of the RAM 22.

Even if a momentary power disconnection has occurred in the ECU 30 having the IMMOBI function, since RAM 22 is backed up by the capacitor C1, the stored contents thereof are not lost. Accordingly, the engine CPU 16 refers to the contents stored in the RAM 22, and allows the engine control.

According to the present embodiment, the result of the comparison between the ignition key ID code and the reference ID code achieved by the IMMOBI-HIC 10 is stored in the backed-up RAM 22, and the engine CPU 16 of the ECU 30 determines whether to allow or prohibit the engine control by reference to the contents stored in the RAM 22. Accordingly, the reliable anti-theft determination can be performed even after the momentary power disconnection, and the engine can be restarted by merely turning the ignition switch from the ON position to the START position when the engine has stalled due to the momentary power disconnection.

According to the present invention, every time the power supply starts, it is determined whether the current power supply connection has occurred after a momentary disconnection. If it is determined that the power supply connection follows a momentary disconnection, the IMMOBI function is substantially disabled. Accordingly, even if the engine is stalled due to the momentary power disconnection, the engine can be restarted by merely turning the ignition switch from the ON position to the START position. Thus, even if the IMMOBI function is installed, the maneuverability is not impaired.

What is claimed is:

1. In a vehicle engine control system of the type comprising electronic circuit means having a vehicle anti-theft function which permits control of the vehicle engine in response to input to said electronic circuit means of a correct ID code and which prevents control of the vehicle engine in the absence of said correct ID code input to said electronic circuit means, said electronic circuit means including an engine control unit, and said system including a power supply that is connectable to said engine control unit, the improvement comprising:

first means responsive to each connecting of said power supply to said engine control unit for determining whether or not said connecting follows a preceding momentary disconnection of said power supply from said engine control unit, and second means, responsive to a determination by said first means that there has been a preceding momentary disconnection of said power supply from said engine control unit, for disabling the engine control preventing function of said electronic circuit means, said engine control system being operative to permit control of the vehicle engine when said engine control preventing function of said electronic circuit means has been disabled.

2. The vehicle engine control system of claim 1, wherein said first means includes memory means for storing data representative of said correct ID code, said memory means being operative to retain said stored data for a period of time corresponding to a momentary disconnection of said power supply from said engine control unit but being operative to stop storing said data when said power supply has been disconnected from said engine control unit for a time duration that is longer than said period of time.

3. The vehicle engine control system of claim 1, wherein said first means includes a circuit comprising capacitor means for receiving a charge during time periods when said power supply is connected to said engine control unit and resistor means for discharging said capacitor means during time periods when said power supply is disconnected from said engine control unit, means for establishing a reference potential, and means for comparing the charge potential on said capacitor means with said reference potential to provide a determination that there has been a momentary disconnection of said power supply from said engine control unit when said charge potential is greater than said reference potential.

4. The engine control system of claim 1 including further means for monitoring the running condition of the vehicle at the time said power supply is being connected to said engine control unit, said second means being rendered operative in response to a determination by said further means that the vehicle is running.

5. The engine control system of claim 4, wherein said further means monitors the running condition of the vehicle on the basis of at least one of the vehicle speed and the engine RPM.

* * * * *